United States Patent [19]
Fettel et al.

[11] 3,814,103
[45] June 4, 1974

[54] BINASAL PHARYNGEAL AIRWAY

[75] Inventors: Bruce E. Fettel, Diamond Bar; Samuel Burd, Long Beach, both of Calif.

[73] Assignee: Shiley Laboratories, Inc., Santa Ana, Calif.

[22] Filed: Mar. 8, 1973

[21] Appl. No.: 339,098

[52] U.S. Cl.............................. 128/351, 128/348
[51] Int. Cl............................................ A61m 31/00
[58] Field of Search ........... 128/351, 350, 349, 348, 128/342, 250, 206, 205, 208, 198, 195, 146.7, 147, 146, 10, 17, 2 F, 2 M, DIG. 9, 188; 285/272, 32

[56] References Cited
UNITED STATES PATENTS

| | | | |
|---|---|---|---|
| 2,208,633 | 7/1940 | Heidbrink | 128/203 |
| 2,638,096 | 5/1953 | Waldhaus | 128/348 |
| 3,461,877 | 8/1969 | Morch | 128/351 |

Primary Examiner—Richard A. Gaudet
Assistant Examiner—Henry J. Recla
Attorney, Agent, or Firm—Fowler, Knobbe & Martens

[57] ABSTRACT

A binasal pharyngeal airway is provided for administering anesthetic which includes a tube connector having hollow legs for connection of pharyngeal tubes, and a hollow swivel body with a swivel connection to said tube connector, having a suction hole opposite the connection to the tube connector for receiving a suction catheter within either of said tube connector hollow legs and having a side opening to receive a snap fitting for connection to an anesthetic line. The airway may be manufactured inexpensively and as a consequence may be disposed of after a one-time use.

15 Claims, 4 Drawing Figures

PATENTED JUN 4 1974
3,814,103
SHEET 1 OF 2
Fig. 1.
Fig. 2.
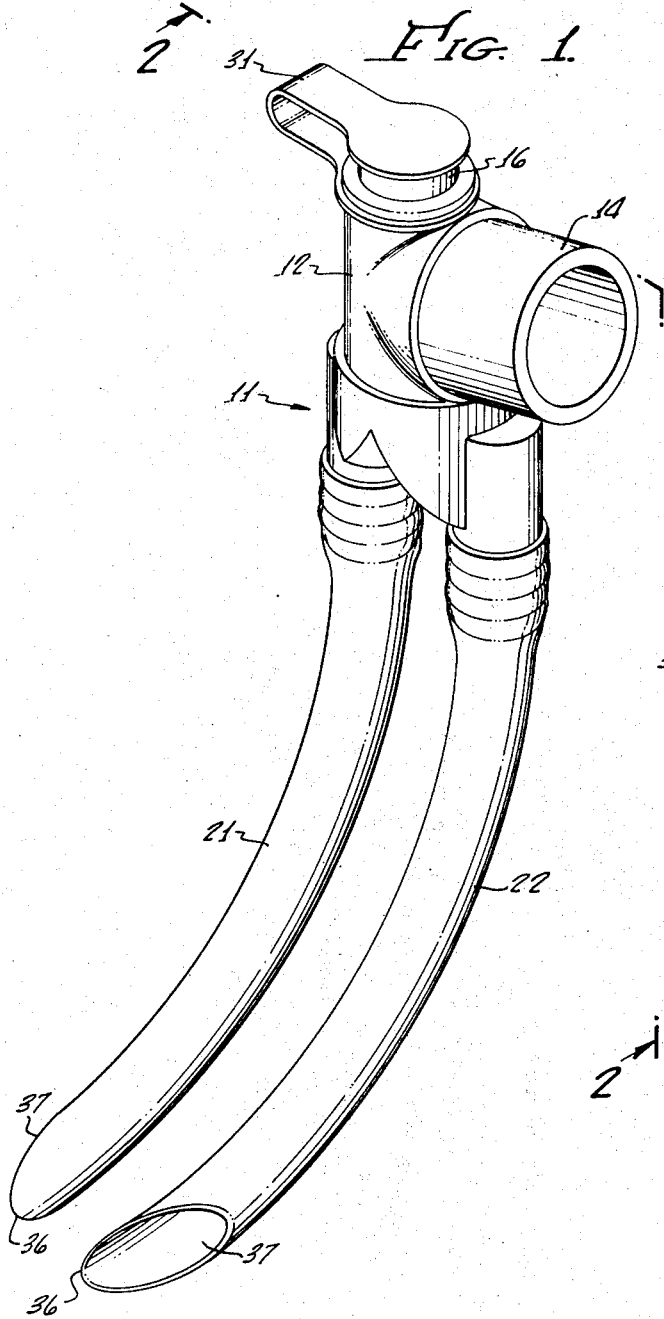
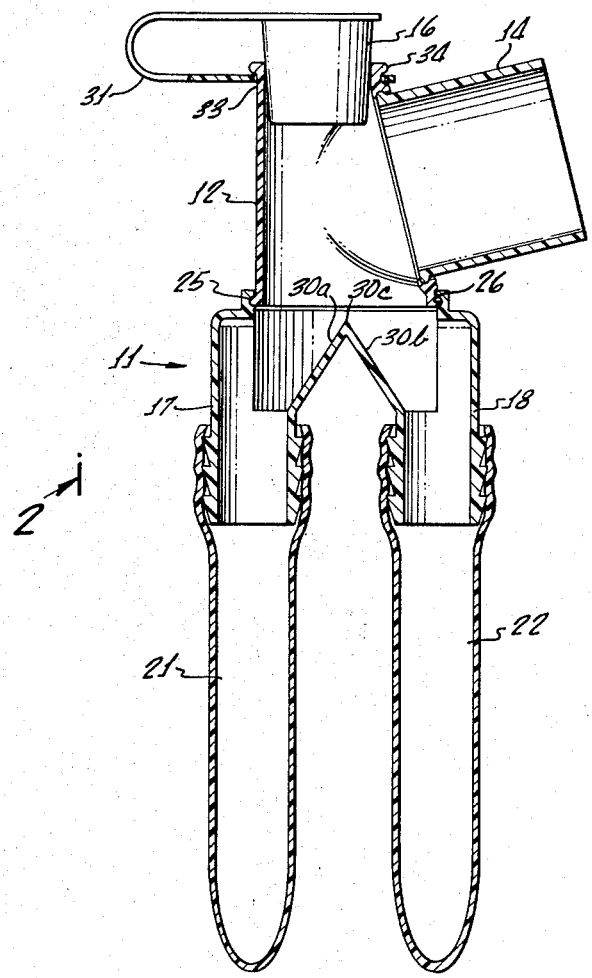

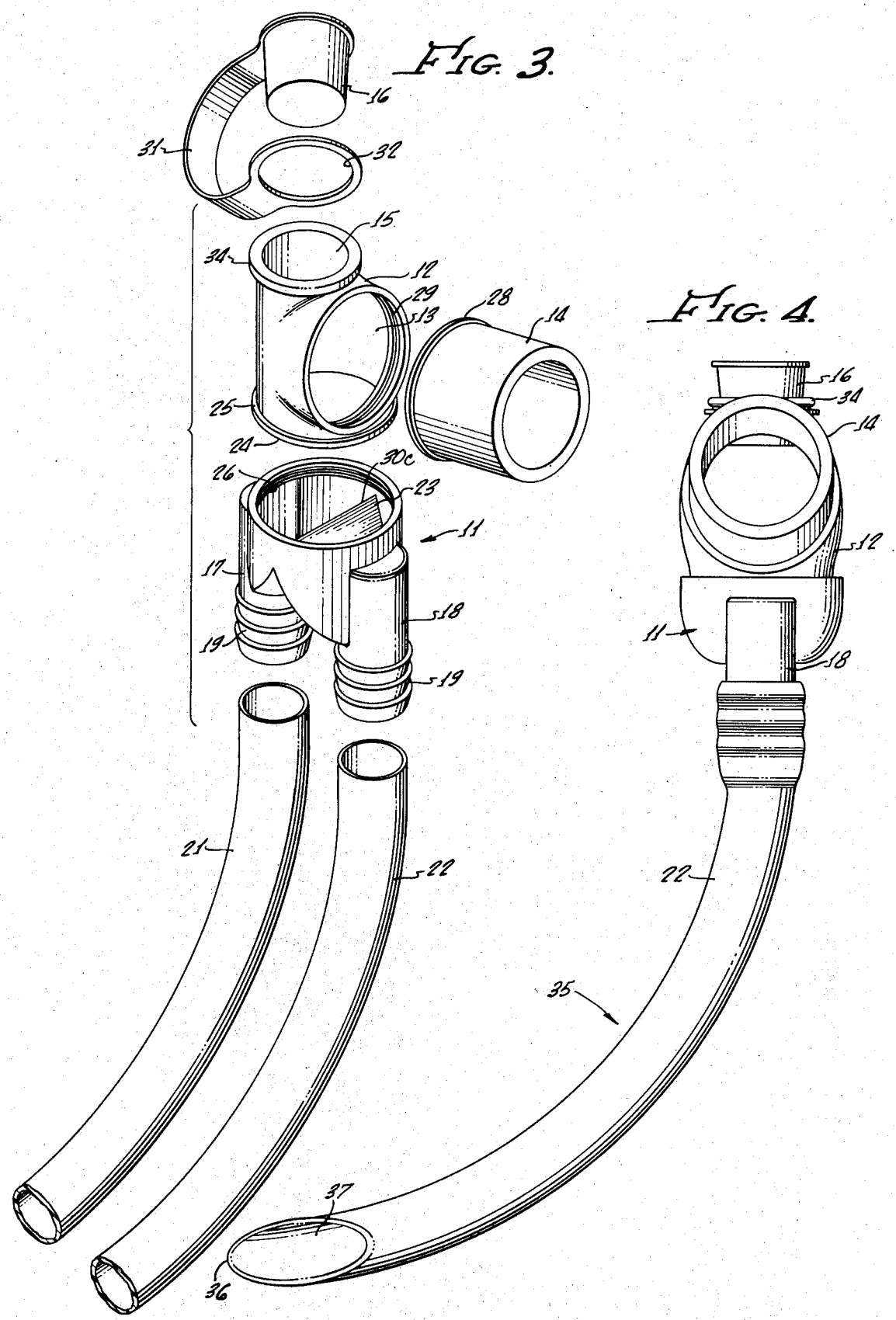

3,814,103

BINASAL PHARYNGEAL AIRWAY

BACKGROUND OF THE INVENTION

For use in anesthesia, in place of a mask or an endotracheal tube, binasal pharyngeal airways have been described consisting of a pair of tubes for insertion in the nostrils and of sufficient length to pass beyond the base of the tongue. However, presently available devices have not been readily adapted for use in different types of operations and have not provided the requisite flexibility of adjustment to avoid discomfort to the patient during insertion or providing the requisite access to the anesthesiologist and to the surgeon for performing a desired type of operation. There has also been difficulty in preventing clogging and kinking of the tubing.

Another disadvantage of the prior art devices is that the processes and materials commonly used for their manufacture, such as dipped or molded latex, are sufficiently expensive to preclude disposing of the device after a one-time use. The refurbishing costs of recleaning and resterilizing such devices are substantial and must be borne by the hospital each time the prior art device is re-used.

SUMMARY OF THE INVENTION

In carrying out the invention in accordance with a preferred form thereof, a central hollow housing or tube connector is provided having a pair of rigid hollow legs. At the upper extremity of the tube connector there is an opening having molded therein an annular groove which mates with the lip of a swivel body. The swivel body includes an aperture which may be closed by a stopper, and another opening having formed therein an annular groove adapted to engage the lip of an anesthetic line connector. A pair of flexible tubes are provided for connection to the rigid legs of the tube connector to form a complete device.

Preferably the tube connector and the swivel body are formed of a substance which has inherent lubricating properties such as polypropylene or polyethylene and which may be sterilized by sterilizing gas and the tubes are formed of a soft flexible readily sterilized material such as polyvinylchloride. The opening and stopper permit a suction catheter to be passed through either tube for sucking out mucous, thereby clearing these passageways when the device is being used clinically. The swivel body has the advantage of permitting two degrees of freedom of movement relative to the tubes which is a significant clinical advantage for administering anesthetic to a patient with minimum discomfort to the patient and without inconvenience to the anesthetist or the surgeon.

A further advantage of the binasal pharyngeal airway constructed in accordance with this invention is that it may be formed of inexpensive materials such as polypropylene, polyethylene or polyvinylchloride and manufactured efficiently and inexpensively by injection molding and extruding the plastic material. As a result, the binasal pharyngeal airway of this invention may be sterilized at the factory and provided to the anesthetist in a sterile package. Because the device is inexpensive, it may be disposed of upon completion of the surgical procedure. The relatively substantial refurbishment costs otherwise borne by the hospital are thus eliminated.

A better understanding of the invention will be afforded by the following detailed description considered in conjunction with the accompanying drawings.

DRAWING

In the drawings,

FIG. 1 is a perspective view of an embodiment of the invention;

FIG. 2 is a view in longitudinal section of the device illustrated in FIG. 1;

FIG. 3 is a perspective view corresponding to FIG. 1 but with the component parts separated to form an exploded view; and FIG. 4 is a side elevation of the device represented in FIG. 3 as seen from the side having the connector for an anesthetic line.

Like reference characters are utilized throughout the drawings to designate like parts.

DETAILED DESCRIPTION

In the drawings a dual-passage connector assembly is illustrated for use as a binasal pharyngeal airway. In the form illustrated there is a tube connector 11 for connection to a swivel body 12 having an opening 13 mating the end of an anesthetic line connector 14. As shown, the opening 13 is a side opening. There is also an end opening 15 in the swivel body 12, normally closed by a stopper 16.

The tube connector 11 has a pair of rigid hollow legs 17 and 18, each barbed with sloping-surface ridges 19 to receive pharyngeal tubes 21 and 22.

The tube connector 11 has an upper opening 23 adapted to mate with the lower opening 24 of the swivel body 12. The swivel body 12 is formed with a lip 25 around the edges of the lower opening 24 adapted to fit slideably in an annular groove 26 within the edges of the upper opening 23 of the tube connector 11. Thus a readily rotatable swivel connection is provided between the swivel body 12 and the tube connector 11.

A swivel connection is also made between the anesthetic-line connector 14 and the swivel body 12. Thereby 2° of freedom are provided to enable the anesthesiologist to insert the tubes 21 and 22 properly in the patient's nostrils with the swivel body 12 and the connector 11 at the requisite angle for connection with an anesthetic line without stressing the patient's face or any of the apparatus or kinking any of the lines or tubing. The arrangement enables the anesthesiologist to place the apparatus including the anesthetic lines in the best position for the surgeon to perform the operation most conveniently and to obtain access to the patient's organs involved in the operation.

In order to provide a swivel connection between the anesthetic-line connector 14 and the swivel body 12 the connector 14 is formed with a lip 28 around the opening at one end fitting within an annular groove 29 formed within the side opening 13 of the swivel body 12. The parts are dimensioned to provide a slip fit for rotation of the connection 14 with respect to the swivel body 12.

The upper end opening 15 in the swivel body 12 is located opposite the lower end opening 24 and opposite the interior of the hollow legs 17 and 18 in order that a suction catheter may readily be inserted through the opening 15 into either of the hollow legs 17 or 18 and tubes 21 or 22 for sucking out any mucous which may have entered the tubing 21 or 22 so as to free the passages for entry of anesthetic. As best shown in FIGS. 2 and 3, the adjacent interior walls 30a and 30b of the legs 17 and 18 are joined at an apex 30c to minimize the obstructing area within the tube connector 11 and thereby facilitate the passage of the catheter through body 12 and connector 11 into the pharyngeal tubes 21 and 22. Also a thin layer of silicone oil can be used in the internal passages of the binasal pharyngeal airway to facilitate passage of the suction catheter.

As indicated previously the upper end opening 15 is normally closed by the stopper 16. Preferably the stopper 16 is a captive stopper having a holding strap 31 formed integrally therewith with a circular opening 32 at the end of the strap 31 adapted to fit around a neck 33 provided at the upper end of the swivel body 12. A lip 34 is provided around the neck 33 to retain the holding strap 31 of the plug 16.

Although in some cases adequate sterilization may be accomplished by thorough scrubbing with surgical soap to remove lubricant and secretions and subsequent mechanical flushing with water, the parts are preferably composed of material which may be sterilized by gas such as ethyleneoxide, for example. Moreover, the swivel body 12, the tube connector 11 and the anesthetic-line connector 14 are preferably composed of a material which has inherent lubricating properties in order to provide ready rotation at the mating connections with sufficient tightness of the joints to prevent leakage. A satisfactory substance for the swivel body and the connectors has been found to be a polymerized olefin such as polyethylene or polypropylene. Satisfactory life under gas sterilization techniques and flexibility for the comfort of the patient have been achieved by the use of tubes 21 and 22 composed of polyvinylchloride.

Another advantage of the polyethylene or polypropylene materials is that they are inexpensive and can be efficiently manufactured into the design configurations. Advantageously, the tube connector 11, swivel body 12 and the anesthetic-line connector 14 are manufactured by injection molding and the tubes 21 and 22 are manufactured by extrusion. The tube connector, swivel body and anesthetic-line connector may be quickly assembled by simply snapping together their swivel connectors. The polyethylene, polypropylene and polyvinylchloride materials permit these parts to temporarily deform when the parts are forced together and thereby allow, for example, lip 25 of the swivel body to be snapped into the annular groove 26 of the tube connector. As a result, the binasal pharyngeal airway of this invention is inexpensive and may be disposed of after a one-time use. Consequently, all hospital refurbishment costs are eliminated.

For the greatest comfort to the patient the tubes 21 and 22 are preferably formed with an initial set in the form of an arc 35 as shown in FIG. 4. The radius of curvature of the arc 35 may be from one-half to the full length of the tube 21 or 22. Moreover, for the comfort of the patient the tube ends are cut off at a diagonal, as illustrated in FIG. 1, which forms an acute angle with the tube, for example, of approximately 25° to 45° with the center line of the tube. The entire lower edge 37 of the tube is rounded or blunted to minimize any tendency for inducing nosebleed of the patient. The radius of curvature for the lower edge may conveniently be made one-half of the tube wall thickness. If the diameter of the tube is quite small and the tube end is cut off at a very sharp angle, it may be necessary to further blunt the tip 36 of the tube. Preferably the radius of curvature for the tip would be between no less than 0.030 inches.

In the use of the binasal pharyngeal airway described herein, a topical nasal anesthetic lubricant should be spread over the tube exterior for one-third of the length of the tube end. It has been found beneficial to put a slight torque of 70° to 80° on each tube (the left twisted clockwise and the right counterclockwise). With this torque and the tips directed posterior in just the slightest inferior attitude, the tubes pass easily and atraumatically. There is an occasional nare that offers slight resistance. However, the use of force should be avoided. In such a case the tube is permitted to rest in a location of resistance for two or three breaths, then with a repeat of the initial tube torque and gentle pressure it will follow the nare passage easily. Prior to the binasal intubation of the pharynx the patient is well medicated and placed in a position suitable for the proposed procedure and a suitable inducing dosage is administered such as thiopenthal or succinylcholine.

What is claimed is:

1. In a binasal pharyngeal airway having a pair of pharyngeal tubes and means for connecting said tubes to an anesthetic-line, the improvement wherein said connecting means comprises:
   a hollow swivel body permitting two degrees of freedom of movement between said anesthetic-line and said pharyngeal tubes, said swivel body having
      a first opening in one end formed with a lip around the edges thereof,
      a second opening for permitting access to the interior of said swivel body,
      means for selectively closing said second opening, and
      a side opening formed with an annular groove therearound;
   a tube connector having
      an upper opening formed with an annular groove therearound engaged with said lip of said hollow swivel body to provide a rotatable snap-in swivel connection between said hollow swivel body and said connector,
      a pair of downwardly extending rigid hollow legs respectively engaging said pharyngeal tubes
      means forming an apex between said legs directed toward the second, selectively closable opening in said swivel body to facilitate the passage of a catheter or the like through said connecting means and into one or the other of said legs; and
   an anesthetic-line connector having
      an opening in one end formed with a lip therearound the edges thereof engaged in the annular groove around the said side opening of said hollow swivel body to provide a rotatable snap-in swivel connection between said hollow swivel body and said connector, and
      an opening for providing a passage for fluid flow from said anesthetic line.

2. In a binasal pharyngeal airway as described in claim 1 wherein each of said hollow legs are externally barbed with sloping ridges to receive and securely retain said pharyngeal tubes.

3. In a binasal pharyngeal airway having a pair of pharyngeal tubes and means connecting said tubes to an anesthetic-line, the improvement wherein the connecting means comprises:

a hollow swivel body so constructed as to permit two degress of freedom of movement between said anesthetic-line and said pharyngeal tubes, said swivel body having first, second and third openings providing passageways into the hollow interior thereof;

a tube connector rotatably connected to said first opening to permit fluid flow through the connector into said hollow interior and means forming two hollow legs with an apex therebetween, said legs being so constructed as to permit attachment of said pharyngeal tubes thereto, with the apex pointing in the direction of said first opening;

means for selectively closing said second opening and opening the same to permit insertion of a catheter or the like through said swivel body into one or the other of said pharyngeal tubes, said apex being so constructed and disposed as to act as a guide during the insertion of such catheter or the like; and an anesthetic-line connector rotatably connected to said third opening for connecting an anesthetic-line to the swivel body to permit fluid flow from the anesthetic-line through the swivel body and tube connector into the pharyngeal tubes.

4. A binasal pharyngeal airway as described in claim 3 wherein the closing means comprises a removable plug provided for the second opening and means for retaining the plug captive.

5. A binasal pharyngeal airway as described in claim 3 wherein the tube connector and the swivel body are composed of a polymer of an olefin.

6. A binasal pharyngeal airway as described in claim 5 wherein the tube connector and the swivel body are composed of polypropylene.

7. A binasal pharyngeal airway as described in claim 5 wherein the tube connector and the swivel body are composed of polyethylene.

8. A binasal pharyngeal airway as described in claim 3 wherein the tube connector and the swivel body are composed of a substance providing natural lubrication at the mating openings and suitable for sterilizing by subjecting to sterilizing gas.

9. A binasal pharyngeal airway as described in claim 8 wherein the pharyngeal tubes are composed of a substance having properties of polyvinyl chloride.

10. A binasal pharyngeal airway as described in claim 3 wherein the hollow legs are externally barbed for securing the pharyngeal tube end fitting upon the hollow leg.

11. A binasal pharyngeal airway as described in claim 10 wherein each pharyngeal tube has its second end beveled at an acute angle to the tube with a blunt tip.

12. A binasal pharyngeal airway as described in claim 11 wherein the tube connector and the anesthetic-line connector are rotatably connected to the swivel body by means of a lip received in a groove in relatively rotatable snap-in relationship.

13. A binasal pharyngeal airway as described in claim 11 wherein the blunt tip of the tube is rounded with a radius of curvature no less than approximately 0.030 inch.

14. A binasal pharyngeal airway as described in claim 13 wherein the tube is formed with a substantially permanent set in the form substantially of an arc of a circle.

15. A binasal pharyngeal airway as described in claim 14 wherein the tube arc has a radius of curvature between approximately the length of the arc and one-half the length of the tube arc.

* * * * *